United States Patent
Vincekovic et al.

(10) Patent No.: US 12,291,348 B2
(45) Date of Patent: May 6, 2025

(54) AIRCRAFT PROPULSION MODULE AND AIRCRAFT

(71) Applicant: BLUE SPIRIT AERO SAS, Rueil-Malmaison (FR)

(72) Inventors: David Vincekovic, Woodville (AU); Florian Pasquiet, Rochefort du Gard (FR); Olivier Savin, Rueil-Malmaison (FR)

(73) Assignee: BLUE SPIRIT AERO SAS, Rueil-Malmaison (FR)

( * ) Notice: Subject to any disclaimer, the term of this patent is extended or adjusted under 35 U.S.C. 154(b) by 0 days.

(21) Appl. No.: 18/262,252

(22) PCT Filed: Jan. 20, 2022

(86) PCT No.: PCT/EP2022/051236
§ 371 (c)(1),
(2) Date: Jul. 20, 2023

(87) PCT Pub. No.: WO2022/157245
PCT Pub. Date: Jul. 28, 2022

(65) Prior Publication Data
US 2024/0308681 A1   Sep. 19, 2024

(30) Foreign Application Priority Data

Jan. 22, 2021 (EP) ..................................... 21153046
Jul. 21, 2021 (EP) ..................................... 21186951

(51) Int. Cl.
*B64D 37/30* (2006.01)
*B64D 1/10* (2006.01)
*B64D 1/12* (2006.01)

(52) U.S. Cl.
CPC ............... *B64D 37/30* (2013.01); *B64D 1/10* (2013.01); *B64D 1/12* (2013.01); *B64D 2221/00* (2013.01)

(58) Field of Classification Search
CPC . B64D 37/30; B64D 1/10; B64D 1/12; B64D 2221/00
See application file for complete search history.

(56) References Cited

U.S. PATENT DOCUMENTS 11,271,267 B1 *   3/2022   Hansel ................... H01M 50/24
11,505,296 B1 *  11/2022   Seeley .................... B63B 13/00
(Continued)

FOREIGN PATENT DOCUMENTS

DE   202016006522 U1   12/2016
FR        3097201 A1   12/2020
(Continued)

*Primary Examiner* — Medhat Badawi
(74) *Attorney, Agent, or Firm* — FISHERBROYLES, LLP; Roger L. Browdy; Ronni S. Jillions (57) ABSTRACT

An aircraft propulsion module comprises a hydrogen storage system, an electrochemical converter (7) connected to the hydrogen storage system, wherein the at least one electrochemical converter is adapted to convert hydrogen supplied from the hydrogen storage system (12) into electric energy, and an electric motor (5) electrically connected to the electrochemical converter, wherein the electric motor is adapted to generate thrust; wherein the propulsion module comprises at least one separation means (9) adapted to separate at least one component of the propulsion module from the propulsion module. An aircraft comprises at least one such aircraft propulsion module. A method for operating a propulsion module comprises that: during operation of the propulsion module, at least one separation means is actuated, by which actuation at least one component of the propulsion module is separated from the remaining propul- (Continued)

sion module and then falls from the remaining propulsion module.

17 Claims, 6 Drawing Sheets

(56) References Cited

U.S. PATENT DOCUMENTS

| | | | |
|---|---|---|---|
| 12,049,333 B2* | 7/2024 | Rose | B64D 27/24 |
| 2002/0036079 A1* | 3/2002 | Morel | F28D 9/0062 |
| | | | 165/166 |
| 2008/0261084 A1* | 10/2008 | Dineen | H01M 8/04216 |
| | | | 429/515 |
| 2013/0187448 A1* | 7/2013 | Loison | B64D 25/00 |
| | | | 307/9.1 |
| 2013/0285443 A1* | 10/2013 | Loison | H02J 3/381 |
| | | | 307/9.1 |
| 2020/0122830 A1* | 4/2020 | Anderson | G05D 1/0866 |
| 2021/0323670 A1* | 10/2021 | Dalton | H01M 10/486 |
| 2021/0380019 A1* | 12/2021 | Livingston | B64U 50/39 |
| 2023/0136273 A1* | 5/2023 | Wiegman | B64C 29/0025 |
| | | | 320/128 |
| 2023/0202657 A1* | 6/2023 | Meir | B64D 1/22 |
| | | | 414/812 |
| 2024/0076035 A1* | 3/2024 | Vincekovic | B64C 23/06 |
| 2024/0190251 A1* | 6/2024 | Fan | B60L 53/80 |
| 2024/0253831 A1* | 8/2024 | Wankewycz | F17C 5/06 |

FOREIGN PATENT DOCUMENTS

| | | |
|---|---|---|
| WO | 2019241581 A1 | 12/2019 |
| WO | 2020003181 A1 | 1/2020 |
| WO | 2020060488 A1 | 3/2020 |

\* cited by examiner

AIRCRAFT PROPULSION MODULE AND AIRCRAFT

The present invention relates to an aircraft propulsion module comprising a hydrogen storage system, at least one electrochemical converter connected to the hydrogen storage system, wherein the at least one electrochemical converter is adapted to convert hydrogen supplied from the hydrogen storage system into electric energy, and at least one electric motor electrically connected to the at least one electrochemical converter, wherein the electric motor is adapted to generate thrust. The present invention also relates to an aircraft comprising at least one such propulsion module. The present invention further relates to a method of operating such a propulsion module.

In the context of aviation, modules may be defined as airborne equipment anchored to a dedicated point on the aircraft's structure. Mainly used in the military field, they can provide different functions such as extension of the fuel capacity or weapons and external sensors carriage. On the Clip-Air project, presented by the École Polytechnique Fédérale de Lausanne in June 2013, modules could even represent independent cabins to transport passengers.

It is further known from the prior art to provide "electropropulsive modules" distributed along a wingspan of an aircraft wing wherein the propulsion modules are embedded within the wing structure and only a hydrogen storage is removable. It is also known from the prior art to have propulsion modules wherein a wing structure is built around the modules with merged fairings.

WO 2020/003181 A1 discloses a pod for moving a vehicle and also provides a network of interchangeable pods. The pod includes an energy storage and powering machine and a nacelle. The nacelle includes an enclosure for surrounding the energy storage and powering machine and a joining structure for attaching the enclosure to the vehicle. The energy storage and the powering machine include a power generation module, a propulsion module, and an electronics module. The propulsion module includes an electric motor with a propeller module. The electronics module is provided for activating the power generation module to provide electrical energy to the electric motor, wherein the electric motor actuates the propeller module for moving the vehicle.

It is the object of the present invention to at least partially overcome the problems associated with the prior art. It is a particular object of the present invention to provide a hydrogen-fuelled, electrically driven aircraft of the above-described type exhibiting an improved operational safety.

The object is achieved by the subject-matter of the independent claims. Advantageous embodiments can be found, e.g., in the dependent claims and/or in the description.

The object is achieved by an aircraft propulsion module, comprising at least
  a hydrogen storage system,
  at least one electrochemical converter connected to the hydrogen storage system, wherein the at least one electrochemical converter is adapted to convert hydrogen supplied from the hydrogen storage system into electric energy, and
  at least one electric motor electrically connected to the at least one electrochemical converter, wherein the electric motor is adapted to generate thrust;
wherein
  the module comprises at least one separation means adapted to separate at least one component of the propulsion module from (the rest of) the propulsion module.

This gives the advantage that, if a separable component becomes inoperable, e.g., by fire or leakage, the cause of the inoperability will not propagate to the other components. This, in turn, improves operational safety, in particular during a flight of the aircraft.

In general, the removable propulsion module provides an independent, autonomous, and removable part ("module") for thrust generation which, in principle, can be adapted on any aircraft. In particular, the propulsion module is not embedded in the wing or the fuselage of the aircraft but can be added to the aircraft structure, e.g., a wing, by means of a simple fastening interface. In particular, the removable propulsion module comprises all means for aircraft propulsion and only needs to be mechanically attached to the aircraft (e.g., by at least one fastening means) and, potentially, can be brought in data communication with the aircraft (e.g., by being equipped with a wired and/or a wireless communication interface) to receive data for its operation and potentially to feedback status data like a fuel level, possible defects, etc.

The hydrogen storage system may be adapted to store gaseous, liquid and/or solid hydrogen. The hydrogen storage system may comprise at least one hydrogen storage unit for physically storing hydrogen, e.g., a hydrogen tank for storing gaseous and/or liquid hydrogen, a dedicated material (e.g., metal hydride, porous carbon, etc.) for chemical or physical solid hydrogen storage, etc. The hydrogen storage system may further comprise at least one piping network dedicated to supply the at least one electrochemical converter with hydrogen coming from the hydrogen storage unit and/or at least one piping network which allows for external hydrogen refuelling.

In an embodiment, the electrochemical converter comprises at least one fuel cell.

The electric motor is supplied with electric energy from the electrochemical converter. In an embodiment, the electric motor is connected to and thus drives at least one propeller or at least one ducted fan, or even other propulsion means.

It is an embodiment that the propulsion module comprises at least one further means ("electric load") using or storing the electric energy generated by the electrochemical converter. Such an electric load may, for example, include at least one further electric motor (e.g., for moving retractable vortex generators), at least one electric actuator of the separation means (which may also be an electric motor), at least one electric or electronic control means, at least one voltage/current converter, at least one valve, at least one electric switch, at least one lamp, etc. It is an embodiment that at least one voltage/current converter is a DC/DC converter, an AC/DC converter, and/or a DC/AC converter. The at least one electric or electronic control means may comprise or be at least one control unit adapted to control operation of at least one of the components of the propulsion module, especially an energy, power, and/or torque management unit, etc. The at least one electric or electronic control means may comprise a microcontroller, ASIC, FPGA, and/or a data communication interface, e.g., an ethernet interface, etc. The electric load may include at least one electric actuator, e.g., an electric motor, of the separation means (which may also be an electric motor).

It is an embodiment that the propulsion module further comprises at least one electric energy storage unit comprising or being, e.g., at least one rechargeable battery, and/or at least one super capacitor (e.g., a gold cap), etc. This gives the advantage that the at least one electric load of the propulsion module can be supplied with electric energy even if the electrochemical converter generates not enough power (e.g., during peak demand) or is faulty. This also enhances operational safety. In an embodiment, the electric energy storage unit is electrically connected to the electrochemical converter. This gives the advantage that the electric energy storage unit can be charged in flight if the electric power generated by the electrochemical converter is greater than the electric power used by the other components.

Operation of the propulsion module under normal conditions (i.e., without component failure) may comprise at least one operational phase out of the following group of phases:

"Normal operation": During cruise, descent or taxi, the electrochemical converter is designed to entirely supply the electric motor generating thrust. To this effect, hydrogen is pumped from the storage system to the electrochemical converter and is transformed into electric power by the electrochemical converter.

"Peak supply": If the power required by the propulsion module, especially the electric motor generating thrust, at a specific flight phase is greater than the maximum power produced by the electrochemical converter, the power difference may be provided by the electric energy storage unit. The electric energy storage unit may be electrically connected in parallel to the electrochemical converter.

"Recharging": This may be performed on ground or in flight. The electrochemical converter generates electric power, and if the propulsion module needs less power than what the electrochemical converter supplies, the excess electric energy is stored in the electric energy storage unit.

"Refilling": This only involves the hydrogen storage system. Advantageously, during refilling, the hydrogen storage unit may be separated from the other components so that maintenance tasks on the electric motor and/or on the powertrain equipment, etc. may be performed at the same time as refilling hydrogen.

It is an embodiment that the propulsion module further comprises at least one cooling system. The cooling system may be an active and/or a passive cooling system (or any other form of cooling) and may, in case of an active cooling system, thus also regarded to be an electric load. The cooling system may comprise a heat exchanger.

It is an embodiment that the propulsion module comprises a first part and a second part, each of which comprise a respective fairing. The first part and the second part can be separated from each other, e.g., by actuation of the separation means and/or during maintenance.

The first part comprises the power generating function(s) of the propulsion module. To this effect, the first part comprises at least the at least one electrochemical converter and the at least one electric motor. The first part may also comprise the electric energy storage unit and the cooling system. This gives the advantage that maintenance of components of the first part can be carried out separately from refilling which saves time.

The fairing of the first part gives the advantage that it reduces drag penalty, in particular if the first part is a front part located in front of a wing profile (see also below). Advantageously, the shape of the fairing of the first part is continuous with the wing profile at the contact area, i.e., there are no sharp changes at the transition between the fairing of the first part and the wing profile. Also, the fairing protects the components located in the first part from external damages. In an embodiment, a thrust vector of the propulsion module is aligned with the chord of the wing.

In an embodiment, the first part comprises a support in form of a frame, that is surrounded by the fairing. Fixed/attached to the frame is at least one of the components of the first part, e.g., the at least one electric motor, the at least one separation means, the at least one electric energy storage unit, and/or the at least one electrochemical converter. Other components of the first part like the cooling system etc. may also be attached/fixed to the frame.

The second part comprises the hydrogen storage system. To this effect, the second part may comprise at least one hydrogen storage unit in its fairing, e.g., a hydrogen tank, and at least one piping network. Its fairing protects the hydrogen storage unit and the at least one piping network from external damages. The fairing also creates a mechanical link between the wing and the hydrogen storage unit without having to modify the hydrogen storage unit. This is particularly advantageous if an off-the-shelf hydrogen storage unit is used.

The first part and second part are connected via at least one fluid connection line (e.g., a feeding pipe/tube for flowing hydrogen fluid from the second part to the first part). Electric connection lines may be connected to different electronics of the first and/or second part of the module, e.g., for monitoring purposes. Mechanical connection lines may be mechanically connected to certain components and may, e.g., be thin metal wires, plastic cables etc. In the following, fluid connection lines (e.g., for supplying hydrogen), electric connection lines (e.g., for supplying voltage, sending electrical signals, and/or data communication) and mechanical connection lines (e.g., of a components separation means) may collectively called connection lines or "channels".

If the electric motor for generating thrust is connected to a front-side propeller, the first part may be a front part and the second part is a rear part positioned aft of the front part. This enables a particularly compact design.

It is an embodiment that the first part is attached to the second part and/or to the wing. It is an embodiment that the second part is attached to the first part and/or to the wing. If the second part is attached to the wing, it may be positioned underneath the wing profile.

It is an embodiment that the first part is only attached to the second part, and the second part is only attached to the wing. If, in this case, the first part is separated from the second part by actuation of the separation means, it is also separated from the aircraft to which the propulsion module is attached to, and may, e.g. in flight, be free to fall to earth.

It is an embodiment that the at least one separation means being adapted to separate at least one component of the propulsion module comprises separating/detaching this at least one component from the support it is attached to. The actuation of the at least one separation means is remotely controllable, e.g., by a pilot or automatically via a control system. The support may generally be any suitable structure adapted to attach at least one component, in particular to the frame of the first part of the propulsion module.

It is an embodiment that the at least one component separable by actuation of the separation means comprises or is the at least one electrochemical converter, the at least one electric energy storage unit, and/or the at least one electric motor. However, there may also be components that are not separable from the support, e.g., the cooling system.

The support may also be the other part of the propulsion module and or even the wing. This allows separating the first part and/or the second part as a whole. It is an embodiment that the first part and the second part are disconnectable from each other during operation of the propulsion module, e.g., in flight. This gives the advantage that, if one of the two parts is damaged or fails, subsequent damage or failure of the other part can be avoided even in flight. It is an embodiment that the first part and the second part are disconnectable from each other during inoperation of the module, e.g., on ground, e.g., for parts swap, maintenance, or repair.

In an embodiment, the first part is separable from the (rest of the) aircraft by the at least one separation means. The second part may not be separable.

Thus, there exist the possibilities to (a) separate one or more components from one or both or the first part and/or the second part, and/or (b) to separate the first part and/or the second part as a whole, both upon actuation/activation of at least one separation means.

The at least one separation means can be actuated/activated during flight (i.e., taxi, ascend, cruise, descend, etc.).

It is an embodiment that at least one separable (by the at least one separation means) component is removable from the remaining propulsion module after its separation. This gives the advantage that failed or failing components of the propulsion module can be removed from the vicinity of other components thereby enhancing operational safety. Being "removable" may include that a component may be moved outside a fairing of the propulsion module. For example, a component of the first part may be ejected out of the fairing of the first part.

Alternatively, the separated component may stay inside the propulsion module, but in a location that gives enhanced operational safety as compared to the original attachment.

It is an embodiment the separated component is fully removable from the (remaining) propulsion module. This gives the advantage that the separated component will reliably not interfere with the aircraft anymore. For example, the separated component may be ejected out of the propulsion module and then fall to the ground freely. This embodiment is, e.g., applicable for components being separated from the first part while the rest of the first part, including its fairing, remains at the aircraft. This embodiment is also applicable, e.g., for the separation of the whole first part (including its fairing) from the second part and/or the wing which remain at the aircraft.

It is an embodiment that at least one separable component is tethered to the (remaining) propulsion module, even after removal. This gives the advantage that the separated component may be retrieved for repair and/or safe disposal more easily compared to full removal. This embodiment is, e.g., applicable for components being separated from the first part while the rest of the first part, including its fairing, remains at the aircraft, as well as for the separation of the whole first part (including its fairing).

It is an embodiment that the at least one separable component attached to a tether, the other end of which is attached to a spool. This enables a compact and orderly arrangement of the tether in the propulsion module before separation, and reliable unwinding after separation.

It is an embodiment that the spool-attached end is remotely releasable from the spool can, i.e., can be commanded to be released from the spool, e.g., by the pilot of the aircraft. This gives the advantage that, when flying over a safe dropping zone, the spool-attached end may be released, and the component is dropped to the ground in a known area when it can be retrieved. Furthermore, the aircraft lands safely without risking tangling the tether with the propellers or the wheels during the deceleration phase.

Under normal conditions, such a separable component may, for example, be held by one or more axles (also called pins or bolts) ensuring reliable attachment to the frame. An axle may be retained by a fixation element like an R-clip or a snap ring acting as a mechanical breaker, but other means can also be employed. The snap rings are designed to withstand the loads during normal flight conditions but fly off at higher loads.

To achieve this, in one embodiment, the axles can be pulled or pushed by the separation means. The pulling/pushing load is determined to be greater than the load experienced under normal conditions and so large that the mechanical breaker(s) fail. The axle(s) can then be pulled away, thus separating the involved component from the support. When all attachment points are free, gravity may pull the separated component downward out of its module and/or a mechanical system (e.g., a spring having been held in a compressed or extended state when the component is attached) may push it out of the propulsion module.

In a particular embodiment, at least one separable component is in slidable connection with the support, in particular frame, and held in position at the support by at least one axle leading through respective congruent holes in the component and the support, the at least one axle being held in place by a fixation element attached its free end section, and at least one separation means being adapted to remove the at least one axle out of the respective holes against resistance from the respective fixation element, e.g., by pushing or pulling the axle along its longitudinal axis.

That a component is in slidable connection with the support, may in particular mean that without being held in place by the axle (e.g., because it has been removed by the separation means), the separated component can slide along the support but cannot be lifted from the support. In an embodiment, the component can slide down the support driven/pulled by its weight. The slidable connection may be a rail-and-track connection, in which the component comprises at least one rail which may be inserted into at least one track of the support, or vice versa.

It is an embodiment that a component separated from the frame of the first part falls out of the first part through a hatch located in the fairing, in particular located in an underside of the fairing.

It is an embodiment that at least one separation means comprises an electrically driven actuator which, when actuated (e.g., switched on), exerts a force (e.g., a pulling load) on the at least one axle along its longitudinal axis. The actuator may be an electric motor.

It is an embodiment that at least one separation means comprises a mechanical linkage which, when actuated, exerts a force on the at least one axle along its longitudinal axis. This embodiment is particularly cost-effective and does not consume electricity. The linkage may comprise at least one rod (e.g., acting as a lever) and/or at least one cable. The linkage may be connected to a head of the axle, in particular if the actuated linkage exerts a pulling force on the axle.

The attachment may also be achieved by other fastening elements detachable by a separation means instead of axles, for example a latch that is rotated to free the component and/or a movable rest element on which the component rests so that the component is free to fall when the rest element is moved from under the component, In an embodiment, the at least one separation means comprises an electrically driven actuator which operates a mechanical linkage connected to at least one axle.

However, the separation means is not limited to the above examples but may be any suitable means, e.g., comprising explosive charges etc. Generally speaking, the separation means may be used to separate at least component of the propulsion module from the (rest of) the propulsion module, e.g., to separate a component from a frame it is fixed to or to separate the first part of the module from the second part of the module. In one embodiment, the separation means opens, removes, or destroys the connection between the at least component to be separated and the support it is fixed to (e.g., the frame or the second part). Alternatively, the component to be separated is attached to the support via the separation means. Actuating the separation means may then include destroying, disintegrating, or opening the separation means itself such that is not able anymore to hold the at least one component to be separated.

In an embodiment, the support and the at least one separable component attached thereto comprise congruent holes through which at least one connection line is laid. This allows the transfer of fluid and/or electric signals through the pathway created by the holes. This pathway may be a pathway within the first and/or second parts for connections lines of a specific component. Alternatively, the pathway is a pathway between the first part and the second part. In the latter case, the "at least one separable component" may, e.g., be the first part and the support be provided by the second part. When the at least one component (e.g., at least one component of the first part or the first part itself) is separated, the edges of the two holes create a shearing force that shears apart or cuts the at least one connection line running through them. This gives the advantage that separation of the at least one component is not hindered by remaining connection lines.

It is an embodiment that at least one of the holes comprises a cutting edge, e.g., an edge or edge section that is sharp, in particular shaped as a blade. This greatly enhances the ability to sever the at least one connection line laid through both holes. The cutting edge is located such that is cuts through the connection lines when the support and the component close the hole after separation, thus splitting them. It is possible that only one of the holes has a cutting edge. In another variant, both holes have a respective cutting edge, wherein the cutting edges are facing each other over the hole(s).

It is an embodiment that at least one of the holes is an elongated hole. This gives the advantage that the cutting can be made even more effective because of the potentially higher speed/impulse of the moving component at the connection line(s) after separation. In an embodiment, both holes have an elongated form.

To facilitate cutting/splitting of the connection lines further, it is an embodiment that at least one cutting edge is inclined, in particular in the manner of a "Guillotine". Having an inclined edge advantageously concentrates the shear load on one specific side of the connection line(s) to be cut, increasing local stress, and facilitating the cutting.

Thus, the separation means is generally adapted to (a) mechanically separate/detach/isolate at least one component of the propulsion module from the rest of the propulsion module (e.g., a frame) and/or to (b) cut at least one connection line between the separated entities. In particular, a separation means may be actuated to separate at least one component from the frame of the first part so that it can drop out of its fairing. The separated at least one component may fall to the ground or may be tethered to the first part. Also, a separation means may be actuated to separate the first part as such from the second part, in particular if the second part is attached to a wing of the aircraft and the first part is only attached to the second part. Then, the first part is separated from the aircraft. In the latter case, if at least one connection line connects the first and the second parts (e.g. fluid, mechanical and/or electric lines), it is particularly advantageous when a hole of the first part or of the second part, through which at least one connection line is laid is designed with a cutting edge—in particular inclined cutting edge. The reason for this is that in case of separation of the first part, the movement of the first part relative to the second part causes the cutting edge to cut the at least one connection line, thus fully releasing the first part which—if the connection line(s) are not cut—may still dangle about the aircraft.

The object is also achieved by an aircraft, comprising at least one of the aircraft propulsion modules as described above. The aircraft may be embodied in analogy to the module, and vice versa.

It is an embodiment that at least one of the aircraft propulsion modules is attached to a respective wing of the aircraft.

It is an embodiment that the aircraft comprises at least three aircraft propulsion modules per wing.

The object is also achieved by a method for operating a propulsion module as described above, in which, during operation of the propulsion module, at least one separation means is actuated, by which actuation at least one component of the propulsion module is separated from the remaining propulsion module and then falls from the remaining propulsion module. The method may be embodied in analogy to the aircraft and the propulsion module, and vice versa.

For example, the component may fall from the remaining propulsion module only due to gravitational pull, or the gravitational pull may be assisted or enabled by mechanical force, e.g., a spring force.

The above-described features and advantages of the invention as well as their kind of implementation will now be schematically described in more detail by at least one embodiment in the context of one or more figures.

Figure 1:
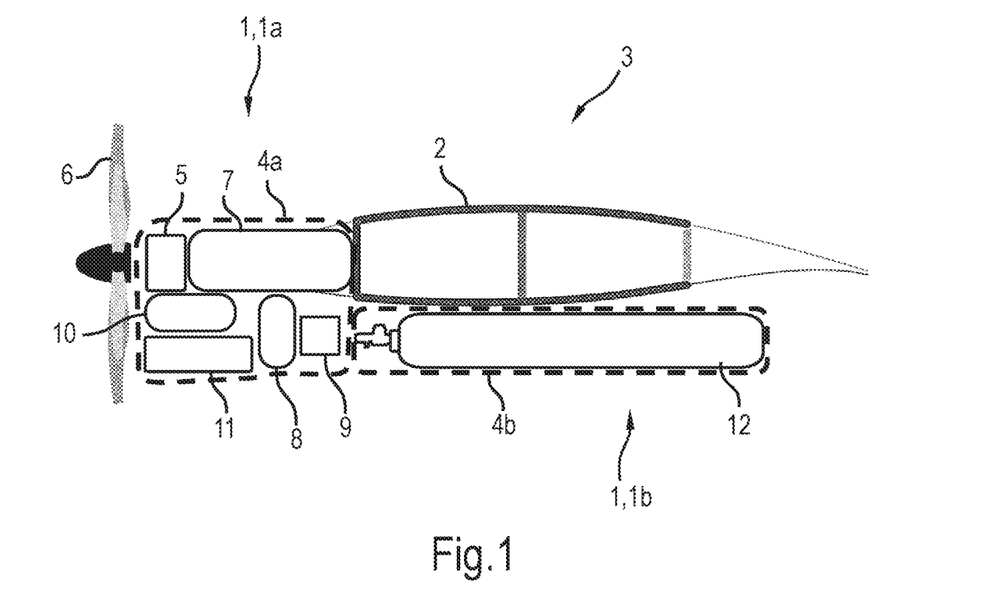
FIG. 1 shows a cross-sectional side view of a propulsion module attached to a wing of an aircraft.

FIG. 1 shows a cross-sectional side view of a propulsion module 1 attached to a wing 2 of an aircraft 3. To reduce costs and maintenance procedures, the propulsion module 1 is divided in several parts, namely here a first ("front") part 1a und a second ("rear") part 1b. In the now described embodiment, the front part 1a, representing the power generating and thrust part, is only attached to the rear part 1b which, in turn, is attached to the wing 2.

The front part 1a comprises a frame 12 (see FIG. 3 to FIG. 8) surrounded by a fairing 4a to reduce drag penalty. Fixed/attached to the frame are an electric motor 5 that drives a propeller 6, an electrochemical converter in form of at least one fuel cell 7, an electric energy storage unit in form of a battery 8, a DC/DC converter 10 for converting the DC voltage/current provided by the fuel cell 7 and/or the battery 8 into voltage/current for operating the electric motor 5, and a cooling system comprising a heat exchanger 11. Other components may also be fixed to the frame.

Also shown is a separation means 9 used for component isolation. To this effect, the separation means 9 is adapted to separate at least one component fixed to the frame 12 from the frame 12. In one embodiment, the separation means 9 opens, removes, or destroys the connection between the component to be separated, e.g., the battery 8, and the frame 12. Alternatively, the component to be separated is attached to the frame 12 via the separation means 9. Actuating the separation means 9 may then include destroying, disintegrating, or opening the separation means 9 itself such that is not able to hold the component at the frame 12 anymore.

The aft or rear part 1b, which may be placed underneath the wing 2, as shown, hosts a hydrogen storage system comprising a hydrogen tank 12 in a fairing 4b. This fairing 4b protects the hydrogen storage system from external damages. It also creates a mechanical link between the wing 2 and the storage system without having to modify the storage system. This is particularly advantageous if an off-the-shelf storage hydrogen tank 12 is used.

Both parts 1a and 1b are connected via at least one fluid connection line 36 exchanging hydrogen between the second part 1b and the first part 1a and via at least one electric connection line 37, see FIG. 14 to FIG. 19 below).

Operation of the propulsion module 1 may comprise at least one out of the group comprising the following four operational phases or states:

"Normal operation": such as, without loss of generality, cruise and/or descent and/or taxi. The fuel cell(s) 7 are designed/dimensioned to fully supply the electric motor 5 with electric energy. The electric energy is generated by the fuel cell 7 based on transformation from hydrogen which is stored in the hydrogen tank 12;

"Peak supply": if the electric power required by the propulsion module 1 at a specific flight phase is greater than the maximum power produced by the fuel cell 7, the difference may be provided by the battery 8;

"Recharging": this phase may be performed on ground or in flight. If the propulsion module 1, in particular the electric motor 5, needs less electric power than what the fuel cell 7 supplies, the excess electric energy is stored in the battery 8;

"Refilling": this phase only involves the storage system. Advantageously, during refilling, the rear part 1b may be separated from the front part so that maintenance tasks on the components of the front part 1a may be performed at the same time.

Figure 2:
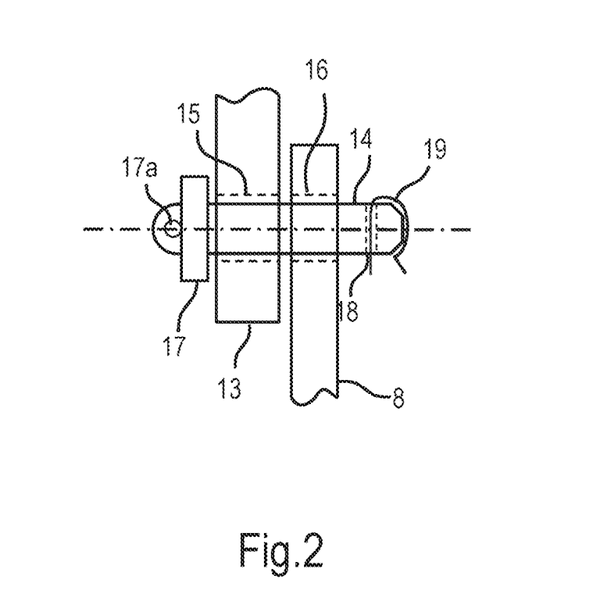
FIG. 2 shows a cross-sectional side view on a cut-out of a component of the propulsion module attached to a frame of the propulsion module by an axle according to a first embodiment using an R-clip.

As shown in FIG. 2, during normal conditions, a component of the front part 1a (here in one example shown as the battery 8) is attached to the frame 13 by one or more axles 14 that are stuck through congruent through-holes 15 and 16 of the frame 13 and the battery 8, respectively. On one side, a head 17 of the axle 14 is wider than the hole 15 and thus will not get inserted into hole 15. The head 17 may be equipped with a through hole 16a.

On its other side, outside the hole 15, when having been stuck through both holes 15, 16, the axle 14 comprises a through hole 18 into which a pin or—as shown—an R-clip 19 etc. can be stuck. Thus, the head 17 on one side and the R-clip 19 on the other side retain the axle 14 in both holes 15, 16. Therefore, the battery 8 is held in position at the frame 13 as long as the axle 14 is not removed.

Under normal conditions, such a component like the battery 8 etc. may be held by several axles 14 making sure that it is securely attached to the frame 13.

Figure 3:
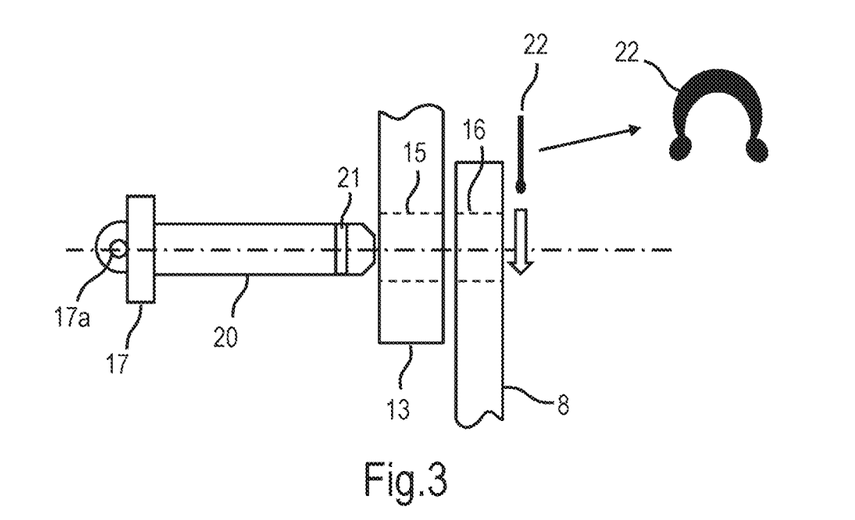
FIG. 3 shows a cross-sectional side view on a cut-out of a component of the propulsion module and a frame of the propulsion module according to the second embodiment before attachment.

FIG. 3 shows another possibility to attach the battery 8 to the frame 13 in an analogous view to FIG. 2. Here, shown in a non-attached state, an axle 20 comprises a ring-shaped notch 21 at its front section, into which a snap ring 22 can be snapped on after insertion of the axle 20 through the holes 15, 16, as indicated by the vertical arrow. The snap ring 22, also shown in frontal view, is designed to withstand the loads during normal flight conditions but will fly off at higher loads.

However, if a component of the propulsion module 1, in particular a component of the front part 1a, has degraded or is faulty, it may be advantageous from a safety point of view to move away/separate this faulty component before it may damage other components. When such a degraded condition or an emergency situation regarding such a component (e.g., the battery 8) is noticed by the pilot or automatically via a control system, the present invention proposes the possibility to separate this component from the rest of the propulsion module 1, in particular front part 1a.

To this effect, the propulsion module 1 comprises at least one separation means 23 (see FIG. 4 to FIG. 6) adapted to separate this component from the frame 13. The weight of the component then causes it to plunge.

Separating or detaching one or more components from the rest of the (remaining) propulsion module 1 may also be called "component isolation", and the respective mechanism a "component isolation mechanism", in particular, if the separated component is removed out of a fairing. The aspect of the separation that involves disconnecting/severing connection lines or "channels" like fluid connection lines, electric connection lines and/or mechanical connection lines etc. may be called "disconnection" or "disconnecting technique".

In the above-described embodiments, the separation of the battery 8 from the frame 13 amounts to a "component isolation". The component isolation may be realized by, e.g., the separation means 23 comprising a remotely actuatable actuator and/or a linkage connected to the head 17 by the hole 17a.

Figure 4:
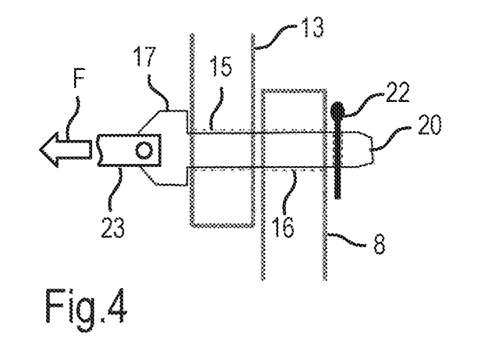
FIG. 4 shows a cross-sectional side view on a cut-out of the second embodiment with the component of the propulsion module attached to the frame of the propulsion module before actuation of a separation means.

When the actuator is actuated (e.g., by switching on an electric motor) and/or when the linkage is actuated (e.g., a linkage leading into the cabin is mechanically manipulated by the pilot), the separation means 23 pulls at the head 17 of the axle 20 in longitudinal axis of the axle 20, as indicated by the pulling load F in FIG. 4.

Figure 5:
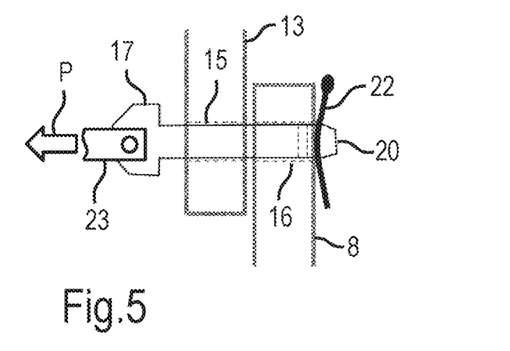
FIG. 5 shows a cross-sectional side view on a cut-out of the second embodiment after actuation of the separation means but with the component of the propulsion module still attached to the frame.
Figure 6:
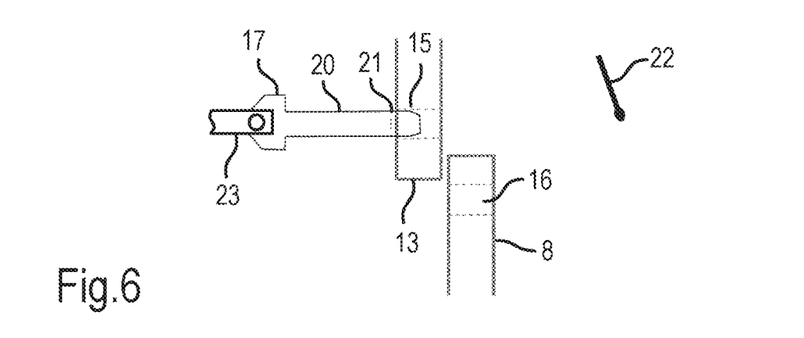
FIG. 6 shows a cross-sectional side view on a cut-out of the second embodiment with the component of the propulsion module separated from the frame.

The pulling load F is greater than the load experienced under normal conditions. This in turn, leads the R-clip 19, the snap ring 22, or any other element or system that acts as mechanical breaker(s), to fail. For example, the snap ring 22 may first bend (as shown in FIG. 5) and then fly off the axle 20 (as shown in FIG. 6), the R-clip 19 may break or may be deformed so greatly that it can be pulled through the holes 15, 16, etc. The axles 14, 20 are then pulled out of the holes 15, 16, thus separating the battery 8 from the frame 13 at this attachment point. When all the attachment points are free, gravity may pull the released battery 8 downward (as shown in FIG. 6). It may then fall further out of the front part 1a (e.g., through a hatch). Alternatively or additionally, it may be pushed out of the front part 1a by a mechanical system, e.g., comprising one or more compressed and/or extended springs.

Of course, instead of being pulled out of the holes 15, 16, the axle(s) 14, 20 may be pushed out of the holes 15, 16 by putting pressure on its free end. Also, the axle(s) 14, 20 may be stuck in the holes 15, 16 in the reverse direction, i.e., the head 17 being positioned at the component to be separated.

Figure 7:
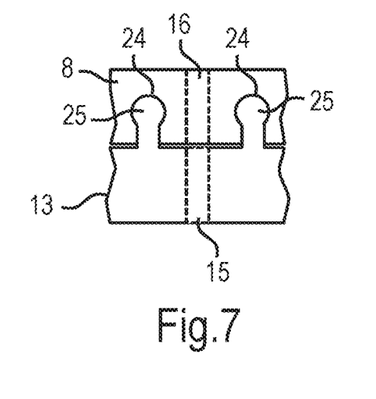
FIG. 7 shows a cross-sectional top view on a cut-out of possible shapes of a component of the propulsion module and a frame of the propulsion module at their contact area.

FIG. 7 shows a cross-sectional top view of possible shapes of a component of the propulsion module 1 (e.g., the battery 8) and a frame 13 of the propulsion module 1 at their contact area. Also, the holes 15 and 16 are shown. The battery 8 comprises two parallel tracks 22 into which respective rails 25 of the frame 13 are inserted. The tracks 24 and rails 25 have the same basic shape that widens inside the battery 8. Thus, the battery 8 can only the moved relative to the frame 13 along the tracks 24 (i.e., along the contact area) but cannot be lifted from the frame 13 (i.e., perpendicular to the contact area). When the axle 14 or 20 is inserted into the holes 15, 16, it prevents relative movement of the battery 8 along the frame 13. This arrangement is particularly advantageous because it prevents forces to be exerted along the axle under normal operating conditions and thus prevents the axle 14 or 20 to be dislodged without actuating the separation means 23. To be able to separate the battery 8 from the frame 13 due to the weight of the battery 8, the tracks 24 are open at least at the top.

Figure 8:
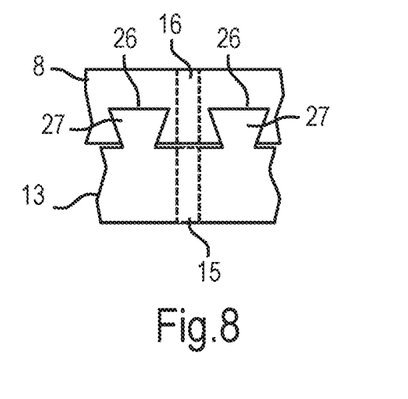
FIG. 8 shows a cross-sectional top view on a cut-out of other possible shapes of a component of the propulsion module and a frame of the propulsion module at their contact area.

FIG. 8 shows a cross-sectional top view of other possible shapes of a component of the propulsion module 1 (e.g., the battery 8) and a frame 13 of the propulsion module 1 at their contact area. The shown arrangement is similar to FIG. 7, with the cross-sectional shape of the tracks 26 and the rails 27 now being trapezoidal.

Of course, the tracks 24 and rails 25 as well as the tracks 26 and rails 27 can also be of reversed arrangements, e.g., with the tracks 24 and 26 in the frame 13 and the rails 25 and 27 in the battery 8. In this case, to be able to separate the battery 8 from the frame 13 due to the weight of the battery 8, tracks 24, 26 are open at least at the bottom.

In an embodiment, the tracks 24 and rails 25 and/or the tracks 26 and rails 27 are aligned in an—at least substantially—vertical direction. This gives the advantage that the battery 8 can slide down along the frame 13, by gravitational pull and/or moved by a spring force when the axle(s) 14, 20 are removed.

Figure 9:
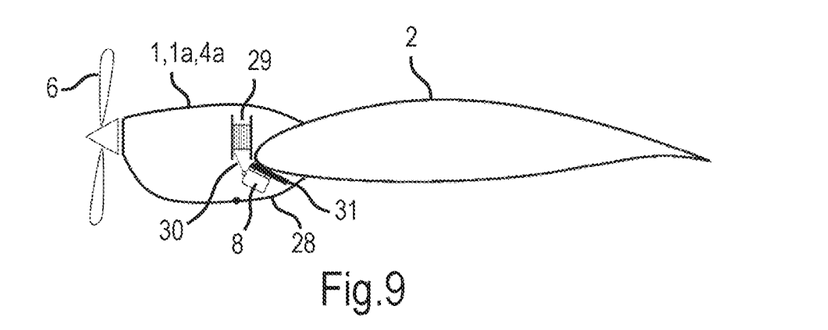
FIG. 9 shows a cross-sectional side view of a wing and a propulsion module with a battery attached to a frame.

FIG. 9 shows a cross-sectional side view of the wing 2 and front part 1a of the propulsion module 1 with the battery 8 attached to the frame 13. The rear part 1b is not shown.

The underside of the fairing 4a of the front part 1a comprises a hatch 28 that opens to release the detached/separated battery 8 out of the fairing 4a. Without further measures, the battery 8, when released from the fairing 4a, will freely fall to the ground.

In an advantageous embodiment, the battery 8 is tethered to a spool 29 positioned in the front part 1a via a mechanical cable/tether 30. This avoids uncontrolled fall of the battery 8 and potential injury or damage from its free fall. In particular, one end of the tether 30 is attached to the battery 8 and the other end is attached to the spool 29. When the battery 8 is attached to the frame, the tether 30 is wound up on the spool 29.

Optionally, the battery 8 is slidably connected to an extendable pole 31. The pole 31 gives the advantage that it prevents the battery 8 from hitting the front part 1a, the rear part 1b or the wing 2, since it is adapted to guide the battery 8 during the initial phase of its fall. When the battery 8 is attached to the frame, the pole 31 is in a retracted state and therefore so short, that it fits into the fairing 4a.

Figure 10:
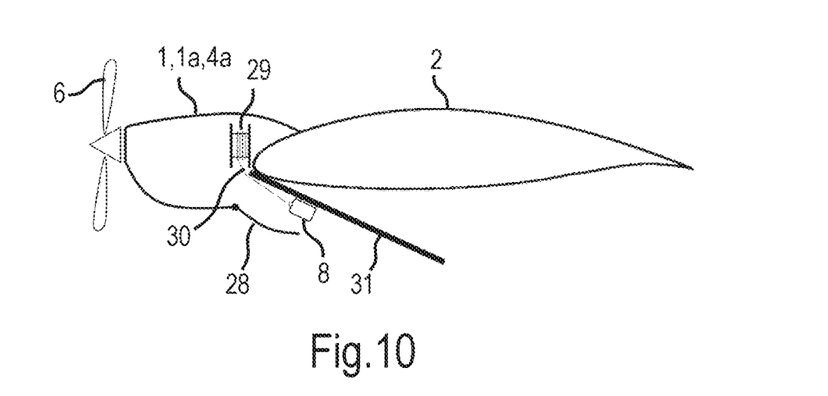
FIG. 10 shows a cross-sectional side view of the wing and propulsion module of FIG. 9 with the battery separated from the frame in an earlier phase of separation.

FIG. 10 shows a cross-sectional side view analogous to FIG. 9 with the battery 8 having been separated from the frame (e.g., caused by actuation of the separation means 23 in the initial phase of separation in which the hatch 28 has been opened and the battery 8 slides down the now extended pole 31. While sliding down, the tether 30 unwinds from the spool 29.

Figure 11:
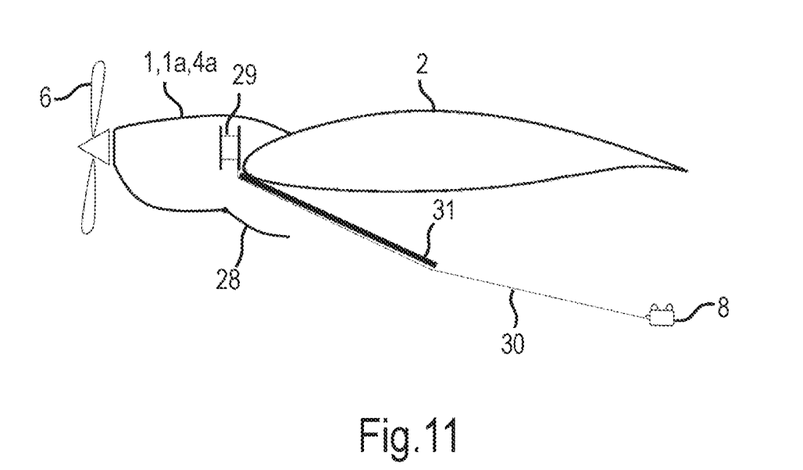
FIG. 11 shows a cross-sectional side view of the wing and propulsion module of FIG. 9 with the battery separated from the frame in a later phase of separation.

FIG. 11 shows cross-sectional side view analogous to FIG. 10 in a later phase of the separation in which the battery 8 has slid down the pole 31, has detached from the pole 31 and now hangs by the unwound tether 30 at a safe distance from any structural part of the aircraft 3.

When flying close to an airport and/or over a safe dropping zone, the spool-attached end of the tether 30 may be released on command, and the battery 8 then drops to the ground in a known drop area. The aircraft 3 lands safely without risking tangling the tether 30 in the propellers 6 or the wheels during the deceleration phase. Depending on the drop area, the battery 8 and the tether 30 can be retrieved.

Figure 12:
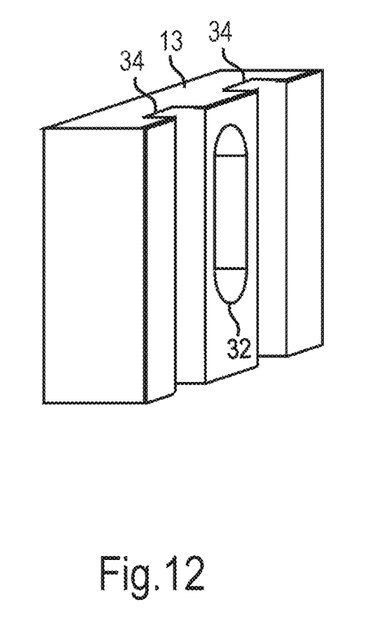
FIG. 12 shows an oblique view on a cut-out of a frame of the propulsion module 1 having an elongated or slotted hole.

FIG. 12 shows an oblique view on a cut-out of a frame 13 of the propulsion module 1 having a hole 32 that is elongated or slotted in the vertical direction. This hole 32 can be present in addition to one or more of the holes 15 described above.

The frame 12 is further equipped with parallel tracks 34, e.g., in form of the tracks 24 or 26 described above, that are shown to be vertically aligned.

Figure 13:
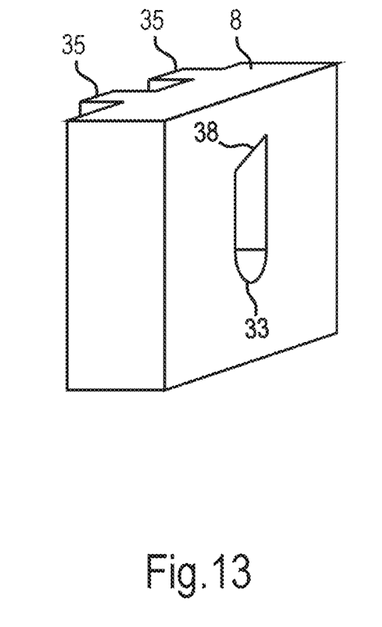
FIG. 13 shows an oblique view on a cut-out of a separable component of the propulsion module 1 having an elongated or slotted hole.

FIG. 13 shows an oblique view on a cut-out of a separable component (here: of a battery 8, as an example) of the propulsion module 1 having a hole 33 that is also elongated or slotted in the vertical direction. This hole 33 can be present in addition to one or more of the holes 16 described above.

The battery 8 is further equipped with parallel rails 35, e.g., in form of the tracks 25 or 27 described above, that are shown to be vertically aligned and fit into the tracks 34 of the frame 13. If not held in position by the at least one axle 14 or 20, the battery 8 slides down the frame 13 in the vertical direction along the tracks 34.

Through the holes 32 and 33 may be passed/laid one or more connection channels/connection lines 36, 37 (see, e.g., FIG. 14 to FIG. 16) in form of at least one fluid connection line 36 (in form of a tube, for example) and/or at least one electric connection line 37 (a data cable and/or a power cord, for example) and/or at least one mechanical line (a thin metallic wire or a plastic cable, for example).

Figure 14:
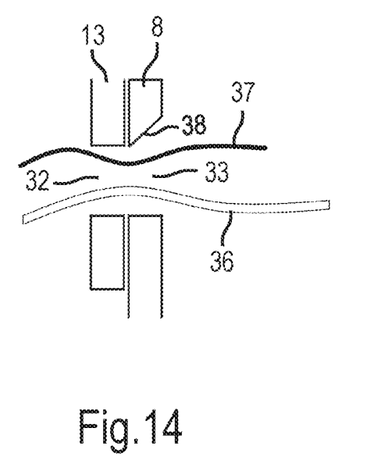
FIG. 14 shows a cross-sectional side view on a cut-out of the frame of FIG. 12 and the component of FIG. 13 attached to it with connection lines running through both parts.
Figure 15:
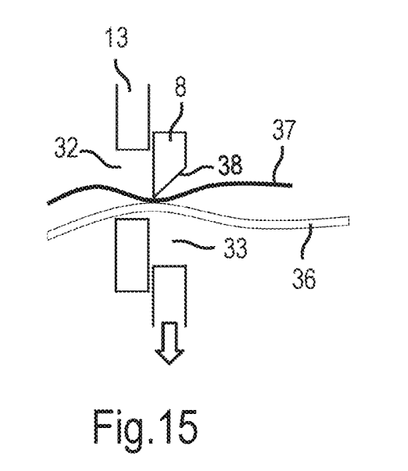
FIG. 15 shows a cross-sectional side view on a cut-out of the frame and the component of FIG. 14 in an earlier phase of separation.
Figure 16:
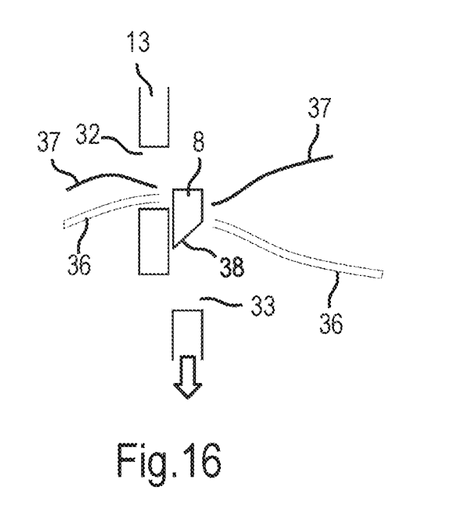
FIG. 16 shows a cross-sectional side view on a cut-out of the frame and the component of FIG. 14 in a later phase of separation.

Generally, when a component of the propulsion module 1, in particular of the front part 1a, is connected to connection lines 36, 37, separation of the component from the frame 13 may not be sufficient to also separate the connection line(s) 36, 37, leading to a failure to fully separate, and/or the separation leads to excessive pulling loads on at least one connection line(s) 36, 37. One solution to this problem is to provide the connection line(s) 36 and/or 37 with a mechanically weak connection interface and/or with a predetermined breaking point. This, however, may also negatively affect the stability and reliability under normal operating conditions, in particular, if the connection line is a pressurized fluid connection line 36. To overcome this problem, the following embodiment is proposed that amounts to a disconnecting technique:

At least one of the elongated holes (here: hole 33) comprises a cutting edge 38, i.e., an edge that, when the battery 8 drops down after separation from the frame 13, cuts through the at least one connection line 36, 37, as seen in the sequence shown in FIG. 14, FIG. 15, and FIG. 16. In case of hole 33, the cutting edge 38 corresponds to the upper section of the hole 33. To cut particularly effectively the at least one connection line 36, 37 the cutting edge 38 is formed as an inclined line in the manner of a Guillotine. Since the hole 33 is elongated, the cutting edge 38 has a higher speed/impulse and shear force when cutting the at least one connection line 36, 37 compared to a smaller round hole. Alternatively or additionally, the lower section of hole 32 may be a cutting edge.

Figure 17:
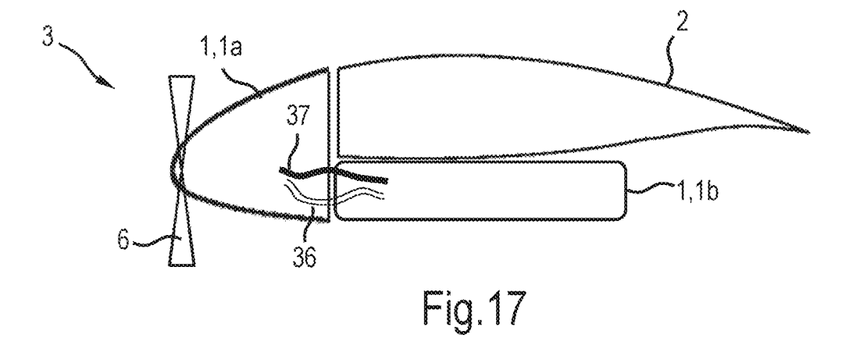
FIG. 17 shows a simplified cross-sectional side view of the propulsion module attached to the wing of the aircraft of FIG. 1.

The combined principles of the component isolation mechanism shown in FIG. 2 to FIG. 8 and the disconnecting technique shown in FIG. 14 to FIG. 16 may not only be applied to the separation of components from the front part 1a but also to the separation of the whole front part 1a from the rear part 1b and/or from the wing 2:

FIG. 17 shows a simplified cross-sectional side view of the aircraft 3 of FIG. 1 with the propulsion module 1 attached to the wing 2. In particular, the front part 1a is still attached to the wing 2 and/or to the rear part 1b, e.g., by use of axles 14 or 20 in analogy to FIG. 2 to FIG. 8. At least one fluid connection line 36 in form, e.g., of a flexible plastic tube runs between the front part 1a and the rear part 1b, e.g., for supplying the fuel cell(s) 7 of the front part 1a with hydrogen stored in the hydrogen tank 11 of the rear part 1b. Additionally, at least one electric connection line 36 in form of an electric cable may run between the front part 1a and the rear part 1b, e.g., to supply at least one valve (not shown) of the hydrogen supply system with electric energy generated by the fuel cell(s) 7. These connection lines 36, 37 run through holes of the front part 1a and the rear part 1b in a manner analogous to FIG. 14 to FIG. 16.

Figure 18:
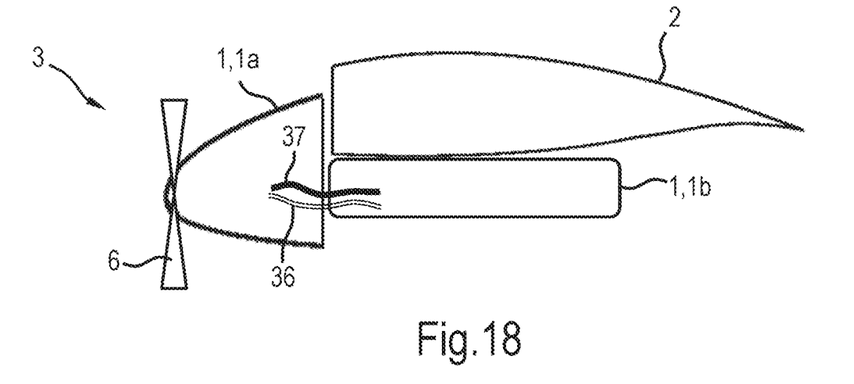
FIG. 18 shows a view similar to FIG. 17 with a front part of the propulsion module in an earlier stage of separation.

FIG. 18 shows a view similar to FIG. 17 with the front part 1a of the propulsion module 1 in an earlier stage of separation analogous to FIG. 15 after the front part 1a has been separated from the rear part 1b and/or the wing 2 by operation of the separation means 23. The front part 1a drops down and will cut the connection lines 36, 37.

Figure 19:
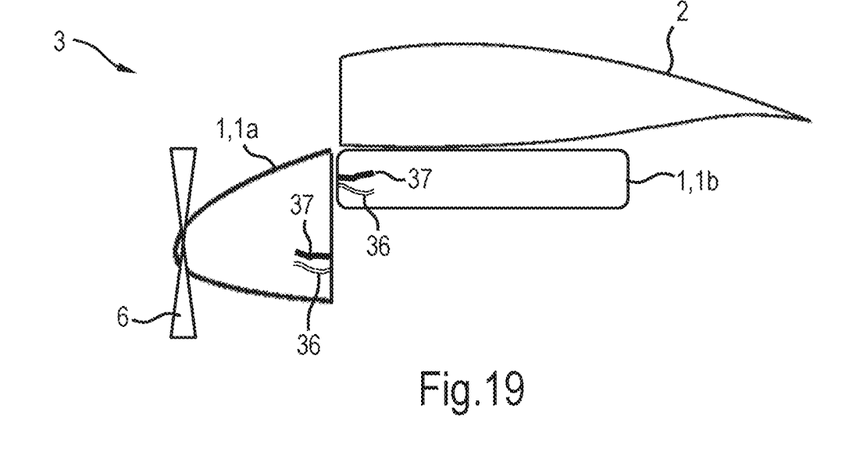
FIG. 19 shows a view similar to FIG. 17 with a front part of the propulsion module in a later stage of separation.

FIG. 19 shows a view similar to FIG. 17 with a front part 1a of the propulsion module 1 in a later stage of separation after the connection lines 36, 37 have been cut. The front part 1a may be in free fall or may be tethered to the rear part 1b, e.g., in analogy to FIG. 9 to FIG. 11.

Of course, the invention is not restricted to the described embodiments.

The invention claimed is:

1. An aircraft propulsion module comprising
a hydrogen storage system,
at least one electrochemical converter connected to the hydrogen storage system, wherein the at least one electrochemical converter is configured to convert hydrogen supplied from the hydrogen storage system into electric energy, and
at least one electric motor electrically connected to the at least one electrochemical converter, wherein the electric motor is configured to generate thrust;
wherein the propulsion module comprises at least one electrical or mechanical actuator configured to separate at least one component of the propulsion module from the propulsion module, and
wherein at least one separable component is tethered to the propulsion module after removal.

2. The aircraft propulsion module according to claim 1, wherein the at least one separable component is removable from the propulsion module after separation.

3. The aircraft propulsion module according to claim 1, wherein the at least one separable component is tethered to one end of a tether, and the other end of the tether is connected to a spool of the aircraft propulsion module.

4. The aircraft propulsion module according to claim 3, wherein the end of the tether connected to the spool is remotely releasable from the spool.

5. The aircraft propulsion module according to claim 1, wherein the at least one separable component comprises or is the at least one electrochemical converter, at least one electric energy storage unit, and/or the at least one electric motor.

6. An aircraft propulsion module comprising
a hydrogen storage system,
at least one electrochemical converter connected to the hydrogen storage system, wherein the at least one electrochemical converter is configured to convert hydrogen supplied from the hydrogen storage system into electric energy, and
at least one electric motor electrically connected to the at least one electrochemical converter, wherein the electric motor is configured to generate thrust;
wherein the propulsion module comprises at least one electrical or mechanical actuator configured to separate at least one component of the propulsion module from the propulsion module,
wherein at least one separable component is in slidable connection with a support and held in position at the support by at least one axle leading through respective holes in the component and the support,
wherein the at least one axle is held in place by a fixation element attached the free end section of the axle, and wherein at least one electrical or mechanical actuator is configured to remove the at least one axle out of the respective holes against resistance from the respective fixation element.

7. The aircraft propulsion module according to claim 6, wherein the slidable connection is such that, when the at least one axle is removed, the separated component slides down the support by weight of the separated component, and then falls out of a fairing of the propulsion module.

8. The aircraft propulsion module according to claim 6, wherein the at least one axle comprises a longitudinal axis, and wherein at least one electrical or mechanical actuator comprises an electrically driven actuator and/or a mechanical linkage which, when operated, exerts a force on the at least one axle along the longitudinal axis.

9. The aircraft propulsion module according to claim 6, wherein the at least one separable component comprises at least one elongated hole and/or the support comprises at least one elongated hole, through which, when the component is attached to the support, at least one connection line is laid, and
wherein at least one of the holes comprises a cutting edge.

10. The aircraft propulsion module according to claim 5, wherein the at least one electrochemical converter, the at least one electric energy storage unit, and the at least one electric motor are located in a first part of the propulsion module, wherein the hydrogen storage system is located in a second part of the propulsion module, and wherein the first part is separable from the second part by the at least one electrical or mechanical actuator.

11. The aircraft propulsion module according to claim 10, wherein the first part and/or the second part comprise at least one elongated hole, through which, when the first part is attached to the second part, at least one connection line is laid, and
wherein at least one of the holes comprises a cutting edge, designed such that, when the first part is separated from the second part by the at least one electrical or mechanical actuator, the cutting edge cuts the at least one connection line.

12. An aircraft, comprising at least one aircraft propulsion module according to claim 1.

13. A method for operating a propulsion module according to claim 1, in which, during operation of the propulsion module, the at least one electrical or mechanical actuator is actuated, by which actuation at least one component of the propulsion module is separated from the remaining propulsion module and then falls from the remaining propulsion module.

14. An aircraft propulsion module comprising
a hydrogen storage system,
at least one electrochemical converter connected to the hydrogen storage system, wherein the at least one electrochemical converter is configured to convert hydrogen supplied from the hydrogen storage system into electric energy, and
at least one electric motor electrically connected to the at least one electrochemical converter, wherein the electric motor is configured to generate thrust;
wherein the propulsion module comprises at least one electrical or mechanical actuator configured to separate t least one component of the propulsion module from the propulsion module,
wherein the at least one separable component comprises or is the at least one electrochemical converter, at least one electric energy storage unit, and/or the at least one electric motor,
wherein the at least one electrochemical converter, the at least one electric energy storage unit, and the at least one electric motor are located in a first part of the propulsion module,
wherein the hydrogen storage system is located in a second part of the propulsion module,
wherein the first part is separable from the second part by the at least one electrical or mechanical actuator,
wherein the first part and/or the second part comprise at least one elongated hole, through which, when the first part is attached to the second part, at least one connection line is laid, and
wherein at least one of the holes comprises a cutting edge designed such that, when the first part is separated from the second part by the at least one electrical or mechanical actuator, the cutting edge cuts the at least one connection line.

15. The aircraft propulsion module according to claim 14, wherein the cutting edge is an inclined cutting edge.

16. The aircraft propulsion module according to claim 9, wherein the cutting edge is an inclined cutting edge.

17. The aircraft propulsion module according to claim 11, wherein the cutting edge is an inclined cutting edge.

* * * * *